United States Patent Office 3,450,668
Patented June 17, 1969

3,450,668
STABILIZED RESIN COMPOSITIONS
Yohei Kawakami, Takatsuki-shi, Toshio Seki, Osaka-shi, and Shigeyoshi Uenaka, Taki-gun, Hyogo-ken, Japan, assignors to Nitto Kasei Co., Ltd., Osaka, Japan, a corporation of Japan
No Drawing. Filed Apr. 14, 1965, Ser. No. 451,677
Int. Cl. C08f 45/62, 45/58
U.S. Cl. 260—45.75                                   1 Claim This invention relates to the method for stabilizing vinylchloride resins.

Generally, chlorinated vinyl resins such as polyvinyl chloride, copolymer of vinyl chloride and vinyl acetate, copolymer of vinyl chloride and vinylidene chloride, etc., are known to be unstable when subjected to heat and light. Such defects are seen during processing, such as calendering, extruding, or molding, or during exposure to ultraviolet radiation.

Although various kinds of stabilizers have been used to provide heat and light stability, they do not always satisfy all requirements from the viewpoint of stabilizing efficiencies such as heat and light stability, and volatility, dispersibility, odor, and irritation to workers.

It is an object of this invention to provide novel stabilizers for halogenated polymers. It is a further object to provide novel stabilized polyvinyl chloride compositions. Other objects will be apparent to those skilled in the art from the following description.

In accordance with certain of its aspects, this invention relates to novel stabilizer compositions for chlorinated resins such as polyvinyl chloride, characterized by their excellent heat and light stability, low volatility, and decreased odor and irritation during processing, which compositions comprise (i) a boron complex prepared by reacting together substantially equimolar quantities of an organic mercaptoacid, a metal salt of an organic mercaptoacid and boric acid; and (ii) an organotin stabilizer for said chlorinated resin.

The boron complexes of this invention prepared from mercaptoacids, metal salts of mercaptoacids, and boric acid, even when used alone, have heat and light stabilizing properties which are superior to organotin stabilizers which are conventionally used. When the novel boron complexes are combined with organotin stabilizers, the combination gives outstanding heat and light stability, and is especially suitable for use with emulsion type polyvinyl chloride resins, the stabilization of which has heretofore been very difficult. For example, the sheet obtained by blending emulsion type polyvinyl chloride, the boron complex of this invention and a commercially available organotin stabilizer at 160° C. for 5 minutes, may typically show outstanding results in tests of heat and light stability, compared with those obtained with sheets containing the boron complex alone or organotin compound alone. This phenomenon demonstrates that the combination of the boron complex and organotin compound greatly improves the heat and light stability of chlorinated vinyl resins.

In a preferred aspect of this invention, the stabilizer compositions comprise the combination of a diorganotin stabilizer and the boron complex. The outstanding superiority of these combinations is illustrated by the hereinafter given examples. From these examples it may be seen that surprising improvements in the resistance to heat and light are imparted by the stabilizer compositions of this invention which are the result of the superior synergistic effects obtained by the novel combination.

The boron complexes of this invention may be obtained by reacting together substantially equimolar amounts of a mercaptoacid, a metal salt of a mercaptoacid, and boric acid. The reaction may be conducted directly, preferably at a temperature of about 80–100° C., with agitation, under which conditions the water formed is readily separated.

The mercaptoacid employed is an organic mercaptoacid, preferably an aliphatic mercaptoacid, and most preferably a lower alkyl mercaptoacid. Examples of the most preferred lower alkyl mercaptoacid are thioglycolic acid and mercaptopropionic acid.

The metal salt of a mercaptoacid which is employed is a salt of an organic mercaptoacid, preferably a salt of an aliphatic mercaptoacid and most preferably a salt of a lower alkyl mercaptoacid such as thioglycolic acid and mercaptopropionic acid. The preferred salts include the thioglycolates and mercaptopropionates of lithium, sodium, potassium, magnesium, barium, strontium, calcium, cadmium and aluminum.

In accordance with certain preferred aspects of this invention, the salt of the mercaptoacid may be an organotin salt, e.g. an organotin thioglycolate and an organotin mercaptopropionate. The most preferred organotin salts of mercaptoacids are those having two hydrocarbon groups bonded to tetravalent tin, one of the remaining valences of tin being satisfied by an alkoxide or alkyl mercaptide radical, and the fourth valence being bonded to a mercaptoacid through the carboxyl group thereof, thereby forming the salt of the mercaptoacid. Examples of these preferred organotin salts of a mercaptoacid include:

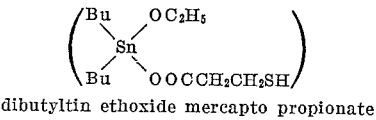
dibutyltin ethoxide mercapto propionate

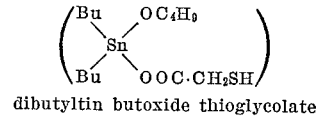
dibutyltin butoxide thioglycolate

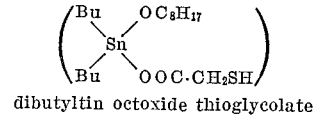
dibutyltin octoxide thioglycolate

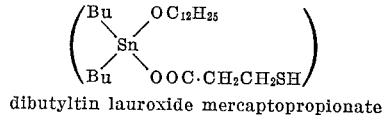
dibutyltin lauroxide mercaptopropionate

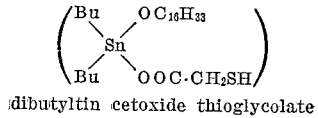
dibutyltin cetoxide thioglycolate

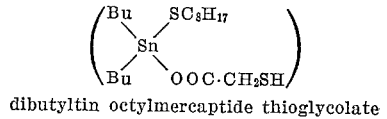
dibutyltin octylmercaptide thioglycolate

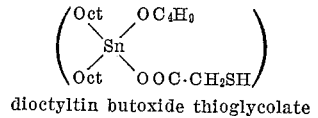
dioctyltin butoxide thioglycolate

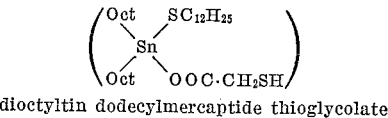
dioctyltin dodecylmercaptide thioglycolate

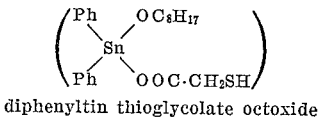
diphenyltin thioglycolate octoxide

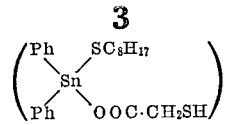

diphenyltin octylmercaptide thioglycolate

The organotin stabilizers which may be used in combination with the novel boron complexes are preferably those selected from the group consisting of $R_2SnX$ and $R_2SnY_2$ wherein R is a monovalent hydrocarbon radical having 1–18 carbon atoms; X is selected from the group consisting of oxygen, sulfur, and the radicals of saturated and unsaturated dibasic carboxylic acids, mercaptoalcohols and mercaptoacids of 2–12 carbon atoms; and Y is selected from the group consisting of the radicals of a mercaptoacid ester, a mercaptan, and a monoester maleate. The term "radical" refers to the anion formed by removing hydrogen from the functional group or groups of the compound. Examples of preferred organotin stabilizers include dimethyltin maleate, dimethyltin dilaurate, diethyltin bis(butyl maleate), diethyltin bis(benzyl maleate), dipropyltin bis(octyl maleate), dibutyltin dilaurate, dibutyltin maleate, dibutyltin bis(ethyl maleate), dibutyltin bis(octyl maleate), dibutyltin bis(cetyl maleate), dibutyltin bis(benzyl maleate), dibutyltin sulfide, dibutyltin bis(butyl thioglycolate), dioctyltin maleate, dioctyltin bis(butyl maleate), dioctyltin dilaurylmercaptide, diphenyltin bis(benzyl maleate), and dibenzyltin sulfide.

The vinyl chloride resins to which the present invention is applicable include polyvinyl chloride homopolymers, copolymers containing predominantly polyvinyl chloride and blends of these resins with other resins. These resins may also contain the customary fillers, colorants and other additives.

The stabilizer compositions of this invention are effective in small amounts. Typically, they may be used suitably in an amount of about 0.1–10 parts by weight per 100 parts by weight of the vinyl chloride resin. Preferably, the ratio of the boron complex to the organotin stabilizer may be about 1:9 to 9:1 by weight.

It is a further advantage that the stabilizer compositions of this invention do not adversely affect lubricants, antioxidants, fillers, dyeing agents, or metallic soaps in the stabilizing systems. The following examples, in which all parts are parts by weight, are given for the purpose of further illustrating the present invention.

EXAMPLE 1

100 parts of emulsion type polyvinyl chloride resin ($\overline{P}=1100$), were compounded with 0.2 part of dibutyltin maleate and 0.8 part of the boron complex consisting of equimolar amounts of thioglycolic acid, sodium thioglycolate and boric acid. This composition is identified as Sample A. For purposes of comparison, a composition identified as Sample B was prepared by compounding 100 parts of the same emulsion type polyvinyl chloride resin ($\overline{P}=1100$) and 1 part of dibutyltin maleate. Both samples were milled on a mixing roll at 160° C. for 5 minutes and specimens of 1 mm. thick and 1 cm. square (hereinafter called "plaque") were prepared. The plaques were then put in an oven at 170° C. for heat stability test. The plaques of Sample B discolored and became yellow in 25 minutes, while the plaques of Sample A did not change color until 40 minutes of exposure to heat.

For the light stability test, the plaques were exposed to ultraviolet radiation by use of a sterilizing lamp (Toshiba lamp GL–15), which was placed at the distance of 45 cm. from the plaques. The plaques of Sample B became yellow in 15 hours of exposure, while those of Sample A did not change color until 23 hours of exposure.

In the tests of volatility, the change of weight in the samples was measured after one hour in a circulating air oven at a temperature of 180° C. Sample B lost 1.8% of its original weight, while Sample A lost only 0.3%.

EXAMPLE 2

Sample C was prepared by compounding 100 parts of suspension type polyvinyl chloride resin; 0.5 part of the boron complex consisting of equimolar amounts of 2-mercaptopropionic acid, lithium thioglycolate and boric acid; and 0.5 part of dibutyltin bis(benzyl maleate). As a comparison, Sample D was prepared by compounding 100 parts of the same suspension type polyvinyl chloride resin and 1 part of dibutyltin bis(benzyl maleate). Tests of heat stability, light stability and volatility of both samples were made by the same procedures as in Example 1. In the heat stability test, the plaques of Sample D changed their color to yellow in 20 minutes, while those of Sample C did not discolor until 35 minutes. In the light stability test, the plaques of Sample D changed their color to yellow in 25 hours; the plaques of Sample C did not change color until 33 hours. In the volatility test, the weight of Sample D was decreased by 1.4%; that of Sample C was decreased only 0.2%.

EXAMPLE 3

Sample E was prepared by compounding 100 parts of vinyl chloride-vinyl acetate copolymer; 0.8 part of the boron complex consisting of equimolar amount of thioglycolic acid, barium thioglycolate and boric acid; and 1.2 parts of dibutyltin bis(ethyl maleate). As a comparison, Sample F was prepared by compounding 100 parts of the same vinyl chloride-vinyl acetate copolymer, and 2.0 parts of dibutyltin bis(ethyl maleate). The heat and light stability, and volatility of the samples were tested by the same procedures as in Example 1. In the heat stability test, the plaques of Sample F changed color to yellow in 40 minutes, but Sample E did not change color until 60 minutes. In the light stability test, the plaques of Sample F changed to yellow in 35 hours; Sample E did not change color until 45 hours. There was a decrease of 2.4% in the weight of Sample F, and only a 0.5% decrease in the weight of Sample E.

EXAMPLE 4

Sample G was prepared by compounding 100 parts of polyvinyl chloride resin containing 10% by weight of chlorinated polyethylene; 0.5 part of the boron complex consisting of equimolar amounts of thioglycolic acid, sodium 2-mercaptopropionate and boric acid; 0.3 part of sodium oleate; and 0.7 part of dibutyltin bis(isopropyl maleate). As a comparison, Sample H was prepared by compounding 100 parts of the same resin and 1.5 parts of dibutyltin bis(isopropyl maleate). In the heat stability test of Example 1, the plaques of Sample H changed color to yellow in 30 minutes, those of Sample G did not change color until 50 minutes. In the light stability test of Example 1, the plaques of Sample H changed color to yellow in 30 hours and those of Sample G did not change color until 40 hours. In the volatility test of Example 1, there was a decrease of 1.5% in the weight of Sample H, but only a 0.4% decrease in the weight of Sample G.

EXAMPLE 5

Sample I was prepared by compounding 100 parts of polyvinyl chloride resin containing 10% by weight of acrylonitrile-butadiene-styrene co-polymer; 0.8 parts of the boron complex consisting of equimolar amounts of thioglycolic acid, potassium 2-mercaptopropionate and boric acid; 0.3 parts of octyl thioglycolate; and 0.4 parts of dimethyltin maleate. As a comparison, Sample J was prepared by compounding 100 parts of the same resin and 1.5 parts of dimethyltin maleate. The heat and light stability test, and volatility test were the same as those employed in Example 1. In the heat stability test, the plaques of Sample J changed color to yellow in 35 minutes, but there was no color change until 45 minutes in the plaques of Sample I. In the light stability test, there was a color change to yellow in 28 hours with the plaques of Sample J, and no color change apparent until 38 hours with the plaques of Sample I. In the volatility test, Sample J lost 2.5% of its weight, while Sample I lost only 1.4%.

EXAMPLE 6

Sample K was prepared by compounding 100 parts of suspension type polyvinyl chloride resin; 0.9 parts of the boron complex consisting of equimolar amounts of thioglycolic acid, dibutyltin lauroxide thioglycolate, and boric acid; and 0.1 parts of dibutyltin dilaurate. As a comparison, Sample L was prepared by compounding 100 parts of the same resin and 1 part of dibutyltin dilaurate. The procedures employed were the same as in Example 1. In the heat stability test, there was a color change to brown with the plaques of Sample L in 35 minutes, but no color change apparent until 50 minutes with the plaques of Sample K. In the light stability test, the plaque of Sample L changed color to yellow in 35 hours, but the plaque of Sample K did not change in color.

Furthermore, heat and light stability tests were obtained by the same procedures, using the following materials and formulations.

(1) As the boron complex, complexes consisting of equimolar amounts of:

(a) boric acid, thioglycolic acid and sodium thioglycolate
(b) boric acid, 2-mercaptopropionic acid and sodium thioglycolate
(c) boric acid, 2-mercaptopropionic acid and calcium thioglycolate
(d) boric acid, thioglycolic acid and sodium 2-mercatopropionate (2) As the organotin stabilizer:

(e) dimethyltin maleate
(f) diethyltin dilaurate
(g) diethyltin bis(ethyl maleate)
(h) dipropyltin bis(butyl thioglycolate)
(i) dibutyltin bis(butyl maleate)
(j) dibutyltin bis(benzyl maleate)
(k) dioctyltin bis(octyl thioglycolate)

Stabilized polymer compositions were prepared by blending together 100 parts of polyvinyl chloride with each of the following:

1 part of (a)+1 part of (i)
0.4 part of (b)+0.6 part of (h)
0.6 part of (c)+0.4 part of (g)
0.8 part of (d)+0.2 part of (f)
1.2 parts of (b)+0.8 part of (j)
1.4 parts of (c)+0.6 part of (k)
1.8 parts of (d)+0.2 part of (e)

As many embodiments of this invention may be made without departing from the spirit and scope thereof, it is to be understood that the invention includes all such modifications as come within the scope of the appended claim.

What is claimed is:

1. A chlorinated resin composition comprising 100 parts by weight of a resin selected from the group consisting of polyvinyl chloride, copolymers of vinyl chloride with vinyl acetate and vinylidene chloride and blends of polyvinyl chloride with chlorinated polyethylene and acrylonitrile-butadiene-styrene co-polymer and about 0.1–10 parts by weight of a stabilizer composition comprising (i) a boron complex prepared by reacting together, at a temperature of 80–100° C., equimolar quantities of a lower alkyl mercaptoacid selected from the group consisting of mercaptopropionic acid and thioglycolic acid; a salt of a lower alkyl mercaptoacid selected from the group consisting of mercaptopropionic acid and thioglycolic acid and a metal selected from the group consisting of lithium, sodium, potassium, magnesium, barium, strontium, calcium, cadmium, aluminum and tin; and boric acid; and (ii) an organotin stabilizer for said resin selected from the group consisting of $R_2SnX$ and $R_2SnY_2$ wherein R is a monovalent hydrocarbon radical having 1–18 carbon atoms; X is selected from the group consisting of oxygen, sulfur, and the anions formed by removing hydrogen from saturated and unsaturated dibasic carboxylic acids, mercaptoalcohols and mercaptoacids of 2–12 carbon atoms; and Y is selected from the group consisting of the anions formed by removing hydrogen from a mercaptoacid ester, a mercaptan, and a monoester maleate; said boron complex and said organotin stabilizer being present in the ratio of about 1:9 to 9:1 by weight.

References Cited

UNITED STATES PATENTS

| | | | |
|---|---|---|---|
| 2,904,570 | 9/1959 | Ramsden | 260—429.7 |
| 3,122,576 | 2/1964 | Jason et al. | 260—429.7 |
| 3,232,905 | 2/1966 | Kelso | 260—45.75 |

DONALD E. CZAJA, *Primary Examiner.*

V. P. HOKE, *Assistant Examiner.*

U.S. Cl. X.R.

260—429.7